US010448257B2

(12) United States Patent
Patel et al.

(10) Patent No.: US 10,448,257 B2
(45) Date of Patent: Oct. 15, 2019

(54) CO-EXISTENCE MECHANISMS FOR SHARED SPECTRUM AND UNLICENSED SPECTRUM

(71) Applicant: QUALCOMM Incorporated, San Diego, CA (US)

(72) Inventors: Chirag Sureshbhai Patel, San Diego, CA (US); Michael Mingxi Fan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/688,122

(22) Filed: Aug. 28, 2017

(65) Prior Publication Data

US 2018/0242163 A1    Aug. 23, 2018

Related U.S. Application Data

(60) Provisional application No. 62/462,615, filed on Feb. 23, 2017.

(51) Int. Cl.
*H04W 4/00*        (2018.01)
*H04W 16/14*       (2009.01)
(Continued)

(52) U.S. Cl.
CPC .......... *H04W 16/14* (2013.01); *H04B 7/0632* (2013.01); *H04L 5/006* (2013.01);
(Continued)

(58) Field of Classification Search
USPC ............... 370/280, 331, 229, 216, 332, 328
See application file for complete search history.

(56) References Cited

U.S. PATENT DOCUMENTS 9,408,103 B2 *  8/2016  Bai ..................... H04W 24/10
10,117,246 B2 * 10/2018  Ji ...................... H04W 36/0072
(Continued)

FOREIGN PATENT DOCUMENTS

WO    WO-2016075123 A1    5/2016

OTHER PUBLICATIONS

Shokri-Ghadikolaei H., et al., "The Transitional Behavior of Interference in Millimeter Wave Networks and Its Impact on Medium Access Control", IEEE Transactions on Communications, vol. 64, No. 2, Feb. 2016, pp. 723-740.
(Continued)

*Primary Examiner* — David Q Nguyen
(74) *Attorney, Agent, or Firm* — Norton Rose Fulbright LLP

(57) ABSTRACT

Co-existence mechanisms for shared spectrum and unlicensed spectrum are disclosed. Several base stations, from one or more network operators, share a communication spectrum in a base non-contention procedure state. When a given base station determines that communications with its served user equipments (UEs) suffers a diminished quality, the base station transmits a diminished quality indicator in response. Subsequent communications with the served UEs over the shared spectrum would then occur using a contention-based procedure state triggered by the diminished quality indicator. The triggering of the contention-based procedure may be made by the base station on either sending the diminished quality indicator or receiving a similar indicator from a neighbor base station, or by an indication from a central controller making a determination to initiate contention-based procedures based on flags received from the neighboring base stations.

30 Claims, 8 Drawing Sheets

(51) Int. Cl.
*H04B 7/06* (2006.01)
*H04W 74/08* (2009.01)
*H04W 48/10* (2009.01)
*H04W 72/08* (2009.01)
*H04L 5/00* (2006.01)
*H04W 24/02* (2009.01)
*H04W 28/16* (2009.01)
*H04W 74/02* (2009.01)
*H04W 72/04* (2009.01)
*H04W 88/06* (2009.01)
*H04W 88/10* (2009.01)
*H04L 5/14* (2006.01)

(52) U.S. Cl.
CPC ........... *H04L 5/0035* (2013.01); *H04W 24/02* (2013.01); *H04W 28/16* (2013.01); *H04W 48/10* (2013.01); *H04W 72/085* (2013.01); *H04W 74/02* (2013.01); *H04W 74/0816* (2013.01); *H04L 5/0007* (2013.01); *H04L 5/0023* (2013.01); *H04L 5/0032* (2013.01); *H04L 5/14* (2013.01); *H04W 72/0453* (2013.01); *H04W 88/06* (2013.01); *H04W 88/10* (2013.01)

(56) References Cited

U.S. PATENT DOCUMENTS

| | | | |
|---|---|---|---|
| 2014/0099955 A1* | 4/2014 | Nukala | H04W 36/00 455/436 |
| 2014/0126544 A1* | 5/2014 | Khay-Ibbat | H04W 36/30 370/332 |
| 2014/0269251 A1* | 9/2014 | Zhou | H04W 24/04 370/216 |
| 2014/0301272 A1* | 10/2014 | Vajapeyam | H04B 1/0475 370/328 |
| 2014/0315555 A1* | 10/2014 | Zhang | H04W 36/0094 455/437 |
| 2014/0334353 A1* | 11/2014 | Wei | H04W 72/1263 370/280 |
| 2015/0011224 A1* | 1/2015 | Kompalli Chakravartula | H04W 36/0083 455/438 |
| 2015/0063098 A1* | 3/2015 | Yavuz | H04W 24/02 370/229 |
| 2015/0085684 A1 | 3/2015 | Sadek | |
| 2015/0282035 A1* | 10/2015 | Xia | H04W 36/08 455/436 |
| 2016/0174124 A1* | 6/2016 | Basu Mallick | H04W 36/0072 370/331 |
| 2016/0353315 A1* | 12/2016 | Li | H04W 28/0263 |
| 2016/0360462 A1* | 12/2016 | Chockalingam | H04W 36/30 |
| 2018/0139666 A1* | 5/2018 | Ahmavaara | H04W 36/0088 |
| 2019/0007181 A1* | 1/2019 | Marinier | H04L 5/0007 |

OTHER PUBLICATIONS

International Search Report and Written Opinion—PCT/US2018/015152—ISA/EPO—dated Apr. 20, 2018.

* cited by examiner

CO-EXISTENCE MECHANISMS FOR SHARED SPECTRUM AND UNLICENSED SPECTRUM

CROSS-REFERENCE TO RELATED APPLICATIONS

This application claims the benefit of U.S. Provisional Patent Application No. 62/462,615, entitled, "CO-EXISTENCE MECHANISMS FOR SHARED SPECTRUM AND UNLICENSED SPECTRUM," filed on Feb. 23, 2017, which is expressly incorporated by reference herein in its entirety.

BACKGROUND

Field

Aspects of the present disclosure relate generally to wireless communication systems, and more particularly, to co-existence mechanisms for shared spectrum and unlicensed spectrum.

Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

SUMMARY

In one aspect of the disclosure, a method of wireless communication includes determining, at a first base station, a diminished quality of communications with one or more served UEs on a shared communication spectrum, wherein the first base station shares the shared communication spectrum with the one or more neighbor base stations communicating with one or more one or more neighbor UEs in a base non-contention procedure state, transmitting, by the first base station, a diminished quality indicator to a central controller of the shared communication spectrum in response to the determined diminished quality, receiving, by the first base station, an indication to switch states to a contention-based procedure state from the central controller in response to the diminished quality of communications, and communicating, by the first base station, with the one or more served UEs over the shared communication spectrum according to the contention-based procedure state triggered by the diminished quality of communications.

In an additional aspect of the disclosure, an apparatus configured for wireless communication includes means for determining, at a first base station, a diminished quality of communications with one or more served UEs on a shared communication spectrum, wherein the first base station shares the shared communication spectrum with the one or more neighbor base stations communicating with one or more one or more neighbor UEs in a base non-contention procedure state, means for transmitting, by the first base station, a diminished quality indicator to a central controller of the shared communication spectrum in response to the determined diminished quality, means for receiving, by the first base station, an indication to switch states to a contention-based procedure state from the central controller in response to the diminished quality of communications, and means for communicating, by the first base station, with the one or more served UEs over the shared communication spectrum according to the contention-based procedure state triggered by the diminished quality of communications.

In an additional aspect of the disclosure, a non-transitory computer-readable medium having program code recorded thereon. The program code further includes code to determine, at a first base station, a diminished quality of communications with one or more served UEs on a shared communication spectrum, wherein the first base station shares the shared communication spectrum with the one or more neighbor base stations communicating with one or more one or more neighbor UEs in a base non-contention procedure state, code to transmit, by the first base station, a diminished quality indicator to a central controller of the shared communication spectrum in response to the determined diminished quality, code to receive, by the first base station, an indication to switch states to a contention-based procedure state from the central controller in response to the diminished quality of communications, and code to communicate, by the first base station, with the one or more served UEs over the shared communication spectrum according to the contention-based procedure state triggered by the diminished quality of communications.

In an additional aspect of the disclosure, an apparatus configured for wireless communication is disclosed. The apparatus includes at least one processor, and a memory coupled to the processor. The processor is configured to determine, at a first base station, a diminished quality of communications with one or more served UEs on a shared communication spectrum, wherein the first base station shares the shared communication spectrum with the one or more neighbor base stations communicating with one or more one or more neighbor UEs in a base non-contention procedure state, to transmit, by the first base station, a diminished quality indicator to a central controller of the shared communication spectrum in response to the determined diminished quality, to receive, by the first base station, an indication to switch states to a contention-based procedure state from the central controller in response to the diminished quality of communications, and to communicate, by the first base station, with the one or more served UEs over the shared communication spectrum according to the contention-based procedure state triggered by the diminished quality of communications.

In yet another aspect of the disclosure, a method of wireless communication includes determining, at a first base station, a diminished quality of communications with one or more served UEs on a shared communication spectrum, wherein the first base station shares the shared communication spectrum with the one or more neighbor base stations communicating with one or more one or more neighbor UEs in a base non-contention procedure state, transmitting, by the first base station, a link quality flag to a central controller of the shared communication spectrum in response to the determined diminished quality, receiving, by the first base station, an indication to switch states to a contention-based procedure state from the central controller in response to the link quality flag, and communicating, by the first base station, with the one or more served UEs over the shared communication spectrum according to the contention-based procedure state triggered by the link quality flag.

In an additional aspect of the disclosure, an apparatus configured for wireless communication includes means for determining, at a first base station, a diminished quality of communications with one or more served UEs on a shared communication spectrum, wherein the first base station shares the shared communication spectrum with the one or more neighbor base stations communicating with one or more one or more neighbor UEs in a base non-contention procedure state, means for transmitting, by the first base station, a link quality flag to a central controller of the shared communication spectrum in response to the determined diminished quality, means for receiving, by the first base station, an indication to switch states to a contention-based procedure state from the central controller in response to the link quality flag, and means for communicating, by the first base station, with the one or more served UEs over the shared communication spectrum according to the contention-based procedure state triggered by the link quality flag.

In an additional aspect of the disclosure, a non-transitory computer-readable medium having program code recorded thereon. The program code further includes code to determine, at a first base station, a diminished quality of communications with one or more served UEs on a shared communication spectrum, wherein the first base station shares the shared communication spectrum with the one or more neighbor base stations communicating with one or more one or more neighbor UEs in a base non-contention procedure state, code to transmit, by the first base station, a link quality flag to a central controller of the shared communication spectrum in response to the determined diminished quality, code to receive, by the first base station, an indication to switch states to a contention-based procedure state from the central controller in response to the link quality flag, and code to communicate, by the first base station, with the one or more served UEs over the shared communication spectrum according to the contention-based procedure state triggered by the link quality flag.

In an additional aspect of the disclosure, an apparatus configured for wireless communication is disclosed. The apparatus includes at least one processor, and a memory coupled to the processor. The processor is configured to determine, at a first base station, a diminished quality of communications with one or more served UEs on a shared communication spectrum, wherein the first base station shares the shared communication spectrum with the one or more neighbor base stations communicating with one or more one or more neighbor UEs in a base non-contention procedure state, to transmit, by the first base station, a link quality flag to a central controller of the shared communication spectrum in response to the determined diminished quality, to receive, by the first base station, an indication to switch states to a contention-based procedure state from the central controller in response to the link quality flag, and to communicate, by the first base station, with the one or more served UEs over the shared communication spectrum according to a contention-based procedure state triggered by the link quality flag.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
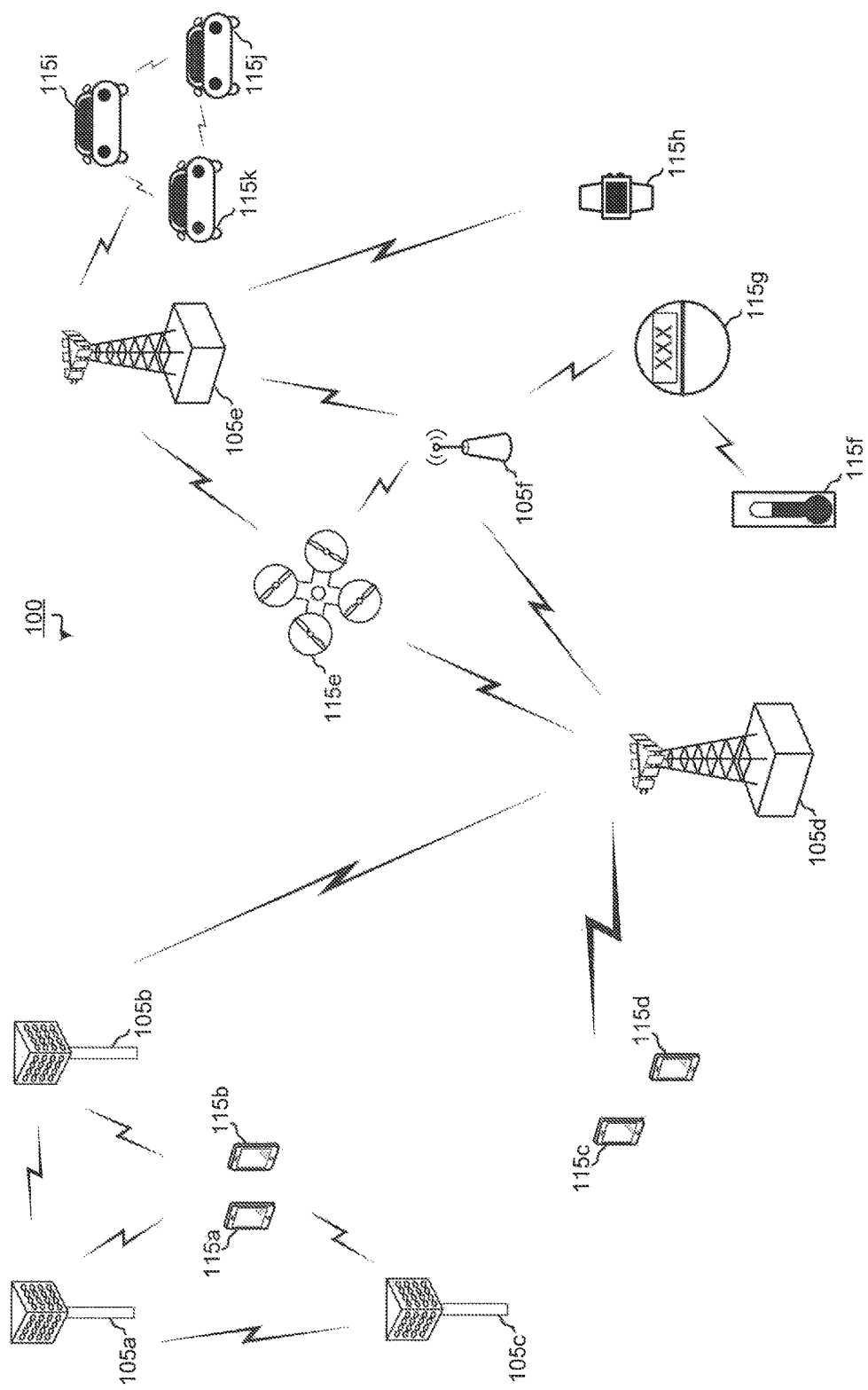
FIG. 1 is a block diagram illustrating details of a wireless communication system.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km$^2$), ultra-low complexity (e.g., ~10s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmW) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmW components at a TDD of 28 GHz, subcarrier spacing may occur with 120 kHz over a 500 MHz bandwidth.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

FIG. 1 is a block diagram illustrating 5G network 100 including various base stations and UEs configured according to aspects of the present disclosure. The 5G network 100 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station and/or a base station subsystem serving the coverage area, depending on the context in which the term is used.

A base station may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, the base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

The 5G network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time.

The UEs 115 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a tablet computer, a laptop computer, a cordless phone, a wireless local loop (WLL) station, or the like. UEs 115a-115d are examples of mobile smart phone-type devices accessing 5G network 100. A UE may also be a machine specifically configured for connected communication, including machine type communication (MTC), enhanced MTC (eMTC), narrowband IoT (NB-IoT) and the like. UEs 115e-115k are examples of various machines configured for communication that access 5G network 100. A UE may be able to communicate with any type of the base stations, whether macro base station, small cell, or the like. In FIG. 1, a lightning bolt (e.g., communication links) indicates wireless transmissions between a UE and a serving base station, which is a base station designated to serve the UE on the downlink and/or uplink, or desired transmission between base stations, and backhaul transmissions between base stations.

In operation at 5G network 100, base stations 105a-105c serve UEs 115a and 115b using 3D beamforming and coordinated spatial techniques, such as coordinated multi-point (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

5G network 100 also support mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through 5G network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. 5G network 100 may also provide additional network efficiency through dynamic, low-latency TDD/FDD communications, such as in a vehicle-to-vehicle (V2V) mesh network between UEs 115i-115k communicating with macro base station 105e.

Figure 2:
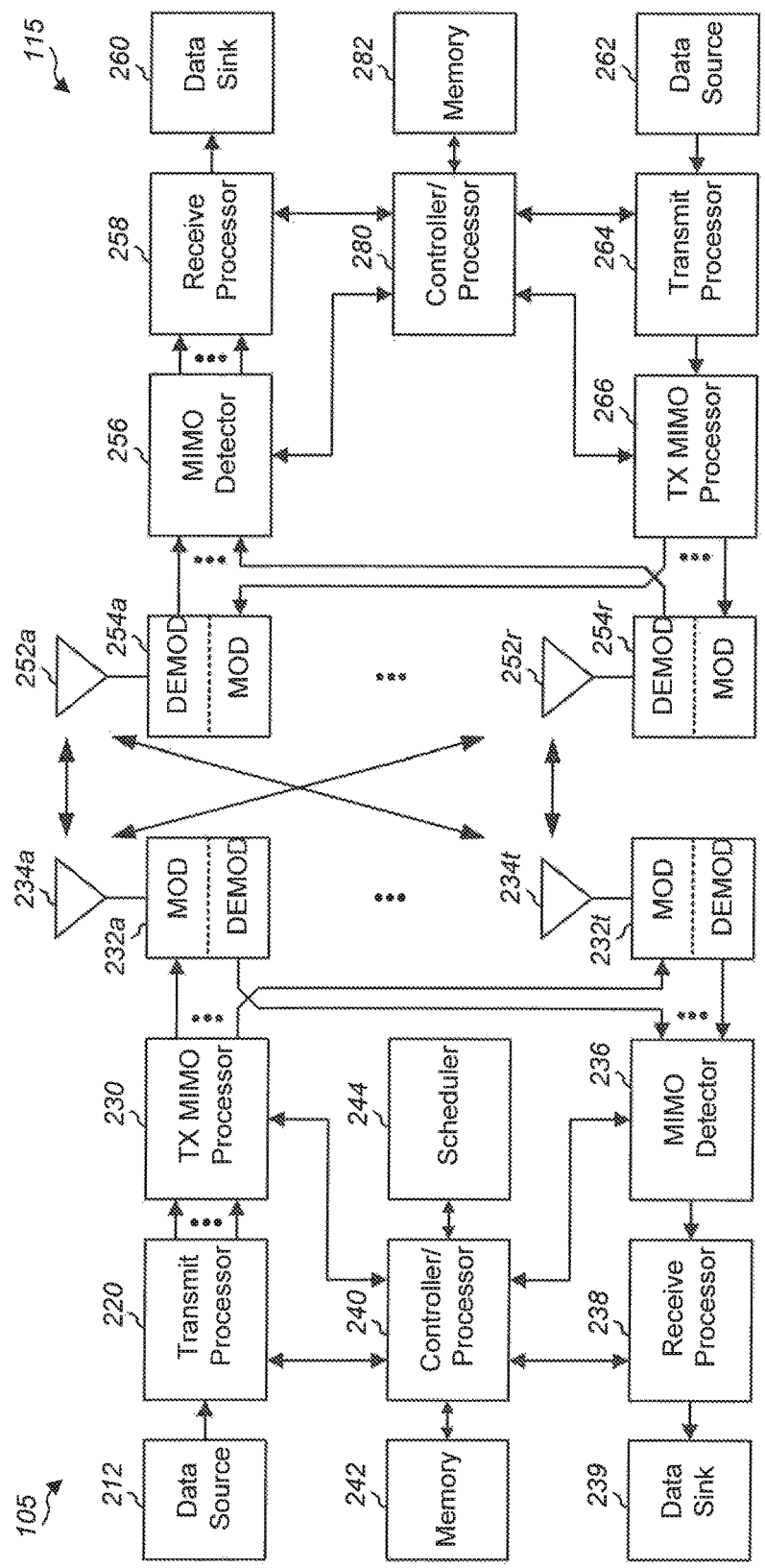
FIG. 2 is a block diagram illustrating a design of a base station and a UE configured according to one aspect of the present disclosure.

FIG. 2 shows a block diagram of a design of a base station 105 and a UE 115, which may be one of the base stations and one of the UEs in FIG. 1. At the base station 105, a transmit processor 220 may receive data from a data source 212 and control information from a controller/processor 240. The control information may be for the PBCH, PCFICH, PHICH, PDCCH, EPDCCH, MPDCCH etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the PSS, SSS, and cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232a through 232t may be transmitted via the antennas 234a through 234t, respectively.

At the UE 115, the antennas 252a through 252r may receive the downlink signals from the base station 105 and may provide received signals to the demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the PUSCH) from a data source 262 and control information (e.g., for the PUCCH) from the controller/processor 280. The transmit processor 264 may also generate reference symbols for a reference signal. The symbols from the transmit processor 264 may be precoded by a TX MIMO processor 266 if applicable, further processed by the modulators 254a through 254r (e.g., for SC-FDM, etc.), and transmitted to the base station 105. At the base station 105, the uplink signals from the UE 115 may be received by the antennas 234, processed by the demodulators 232, detected by a MIMO detector 236 if applicable, and further processed by a receive processor 238 to obtain decoded data and control information sent by the UE 115. The processor 238 may provide the decoded data to a data sink 239 and the decoded control information to the controller/processor 240.

The controllers/processors 240 and 280 may direct the operation at the base station 105 and the UE 115, respectively. The controller/processor 240 and/or other processors and modules at the base station 105 may perform or direct the execution of various processes for the techniques described herein. The controllers/processor 280 and/or other processors and modules at the UE 115 may also perform or direct the execution of the functional blocks illustrated in FIG. 4, and/or other processes for the techniques described herein. The memories 242 and 282 may store data and program codes for the base station 105 and the UE 115, respectively. A scheduler 244 may schedule UEs for data transmission on the downlink and/or uplink.

Wireless communications systems operated by different network operating entities (e.g., network operators) may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time and or frequency resources reserved for exclusive communication by the network operating entity using the entirety of the shared spectrum. The network operating entity may also be allocated other time resources where the entity is given priority over other network operating entities to communicate using the shared spectrum. These time or frequency resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time and/or frequency resources among different network operating entities may be centrally controlled by a separate entity, autonomously determined by a predefined arbitration scheme, or dynamically determined based on interactions between wireless nodes of the network operators.

In some cases, UE 115 and base station 105 may operate in a shared radio frequency spectrum band, which may include licensed, loosely licensed, or unlicensed (e.g., contention-based) frequency spectrum. In an unlicensed frequency portion of the shared radio frequency spectrum band (e.g., 5 GHz, 60 GHz unlicensed bands), UEs 115 or base stations 105 may traditionally perform a medium-sensing procedure to contend for access to the frequency spectrum. For example, UE 115 or base station 105 may perform a listen before talk (LBT) procedure such as a clear channel assessment (CCA) prior to communicating in order to determine whether the shared channel is available. A CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/negative-acknowledge (ACK/NACK) feedback for its own transmitted packets as a proxy for collisions.

Use of a medium-sensing procedure to contend for access to an unlicensed shared spectrum may result in communication inefficiencies. This may be particularly evident when multiple network operating entities (e.g., network operators) are attempting to access a shared resource. In 5G network 100, base stations 105 and UEs 115 may be operated by the same or different network operating entities. In some examples, an individual base station 105 or UE 115 may be operated by more than one network operating entity. In other examples, each base station 105 and UE 115 may be operated by a single network operating entity. Requiring each base station 105 and UE 115 of different network operating entities to contend for shared resources may result in increased signaling overhead and communication latency.

Figure 3:
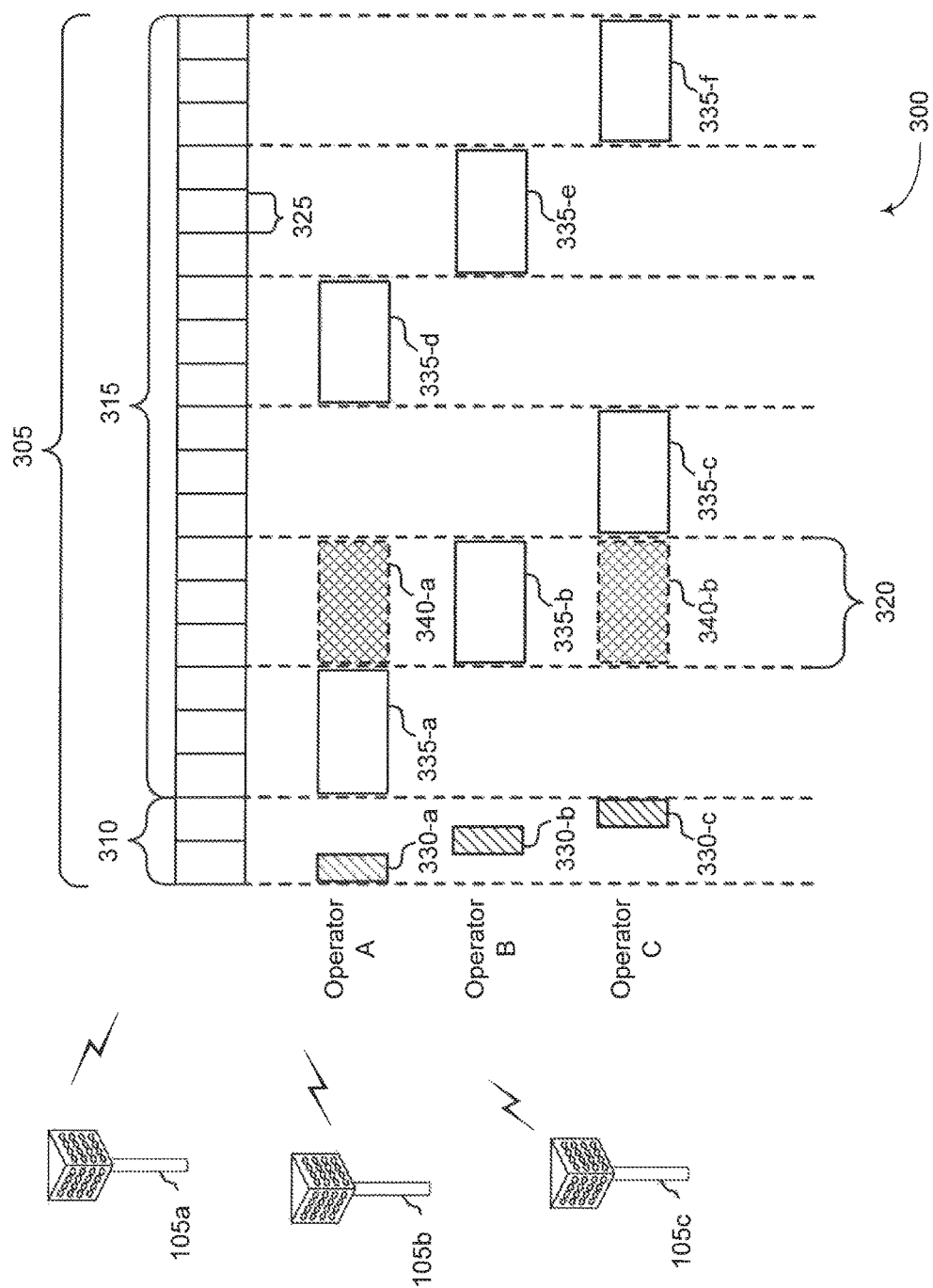
FIG. 3 illustrates an example of a timing diagram for coordinated resource partitioning.

FIG. 3 illustrates an example of a timing diagram 300 for coordinated resource partitioning. The timing diagram 300 includes a superframe 305, which may represent a fixed duration of time (e.g., 20 ms). Superframe 305 may be repeated for a given communication session and may be used by a wireless system such as 5G network 100 described with reference to FIG. 1. The superframe 305 may be divided into intervals such as an acquisition interval (A-INT) 310 and an arbitration interval 315. As described in more detail below, the A-INT 310 and arbitration interval 315 may be subdivided into sub-intervals, designated for certain resource types, and allocated to different network operating entities to facilitate coordinated communications between the different network operating entities. For example, the arbitration interval 315 may be divided into a plurality of sub-intervals 320. Also, the superframe 305 may be further divided into a plurality of subframes 325 with a fixed duration (e.g., 1 ms). While timing diagram 300 illustrates three different network operating entities (e.g., Operator A, Operator B, Operator C), the number of network operating entities using the superframe 305 for coordinated communications may be greater than or fewer than the number illustrated in timing diagram 300.

The A-INT 310 may be a dedicated interval of the superframe 305 that is reserved for exclusive communications by the network operating entities. In some examples, each network operating entity may be allocated certain resources within the A-INT 310 for exclusive communications. For example, resources 330-*a* may be reserved for exclusive communications by Operator A, such as through base station 105*a*, resources 330-*b* may be reserved for exclusive communications by Operator B, such as through base station 105*b*, and resources 330-*c* may be reserved for exclusive communications by Operator C, such as through base station 105*c*. Since the resources 330-*a* are reserved for exclusive communications by Operator A, neither Operator B nor Operator C can communicate during resources 330-*a*, even if Operator A chooses not to communicate during those resources. That is, access to exclusive resources is limited to the designated network operator. Similar restrictions apply to resources 330-*b* for Operator B and resources 330-*c* for Operator C. The wireless nodes of Operator A (e.g, UEs 115 or base stations 105) may communicate any information desired during their exclusive resources 330-*a*, such as control information or data.

When communicating over an exclusive resource, a network operating entity does not need to perform any medium sensing procedures (e.g., listen-before-talk (LBT) or clear channel assessment (CCA)) because the network operating entity knows that the resources are reserved. Because only the designated network operating entity may communicate over exclusive resources, there may be a reduced likelihood of interfering communications as compared to relying on medium sensing techniques alone (e.g., no hidden node problem). In some examples, the A-INT 310 is used to transmit control information, such as synchronization signals (e.g., SYNC signals), system information (e.g., system information blocks (SIBs)), paging information (e.g., physical broadcast channel (PBCH) messages), or random access information (e.g., random access channel (RACH) signals). In some examples, all of the wireless nodes associated with a network operating entity may transmit at the same time during their exclusive resources.

In some examples, resources may be classified as prioritized for certain network operating entities. Resources that are assigned with priority for a certain network operating entity may be referred to as a guaranteed interval (G-INT) for that network operating entity. The interval of resources used by the network operating entity during the G-INT may be referred to as a prioritized sub-interval. For example, resources 335-*a* may be prioritized for use by Operator A and may therefore be referred to as a G-INT for Operator A (e.g., G-INT-OpA). Similarly, resources 335-*b* may be prioritized for Operator B, resources 335-*c* may be prioritized for Operator C, resources 335-*d* may be prioritized for Operator A, resources 335-*e* may be prioritized for Operator B, and resources 335-*f* may be prioritized for operator C.

The various G-INT resources illustrated in FIG. 3 appear to be staggered to illustrate their association with their respective network operating entities, but these resources may all be on the same frequency bandwidth. Thus, if viewed along a time-frequency grid, the G-INT resources may appear as a contiguous line within the superframe 305. This partitioning of data may be an example of time division multiplexing (TDM). Also, when resources appear in the same sub-interval (e.g., resources 340-*a* and resources 335-*b*), these resources represent the same time resources with respect to the superframe 305 (e.g., the resources occupy the same sub-interval 320), but the resources are separately designated to illustrate that the same time resources can be classified differently for different operators.

When resources are assigned with priority for a certain network operating entity (e.g., a G-INT), that network operating entity may communicate using those resources without having to wait or perform any medium sensing procedures (e.g., LBT or CCA). For example, the wireless nodes of Operator A are free to communicate any data or control information during resources 335-*a* without interference from the wireless nodes of Operator B or Operator C.

A network operating entity may additionally signal to another operator that it intends to use a particular G-INT. For example, referring to resources 335-*a*, Operator A may signal to Operator B and Operator C that it intends to use resources 335-*a*. Such signaling may be referred to as an activity indication. Moreover, since Operator A has priority over resources 335-*a*, Operator A may be considered as a higher priority operator than both Operator B and Operator C. However, as discussed above, Operator A does not have to send signaling to the other network operating entities to ensure interference-free transmission during resources 335-*a* because the resources 335-*a* are assigned with priority to Operator A.

Similarly, a network operating entity may signal to another network operating entity that it intends not to use a particular G-INT. This signaling may also be referred to as an activity indication. For example, referring to resources 335-*b*, Operator B may signal to Operator A and Operator C that it intends not to use the resources 335-*b* for communication, even though the resources are assigned with priority to Operator B. With reference to resources 335-*b*, Operator B may be considered a higher priority network operating entity than Operator A and Operator C. In such cases, Operators A and C may attempt to use resources of sub-interval 320 on an opportunistic basis. Thus, from the perspective of Operator A, the sub-interval 320 that contains resources 335-*b* may be considered an opportunistic interval (O-INT) for Operator A (e.g., O-INT-OpA). For illustrative purposes, resources 340-*a* may represent the O-INT for Operator A. Also, from the perspective of Operator C, the same sub-interval 320 may represent an O-INT for Operator C with corresponding resources 340-*b*. Resources 340-*a*, 335-*b*, and 340-*b* all represent the same time resources (e.g., a particular sub-interval 320), but are identified separately to signify that the same resources may be considered as a G-INT for some network operating entities and yet as an O-INT for others.

To utilize resources on an opportunistic basis, Operator A and Operator C may perform medium-sensing procedures to check for communications on a particular channel before transmitting data. For example, if Operator B decides not to use resources 335-*b* (e.g., G-INT-OpB), then Operator A may use those same resources (e.g., represented by resources 340-*a*) by first checking the channel for interference (e.g., LBT) and then transmitting data if the channel was determined to be clear. Similarly, if Operator C wanted to access resources on an opportunistic basis during sub-interval 320 (e.g., use an O-INT represented by resources 340-b) in response to an indication that Operator B was not going to use its G-INT, Operator C may perform a medium sensing procedure and access the resources if available. In some cases, two operators (e.g., Operator A and Operator C) may attempt to access the same resources, in which case the operators may employ contention-based procedures to avoid interfering communications. The operators may also have sub-priorities assigned to them designed to determine which operator may gain access to resources if more than operator is attempting access simultaneously.

In some examples, a network operating entity may intend not to use a particular G-INT assigned to it, but may not send out an activity indication that conveys the intent not to use the resources. In such cases, for a particular sub-interval 320, lower priority operating entities may be configured to monitor the channel to determine whether a higher priority operating entity is using the resources. If a lower priority operating entity determines through LBT or similar method that a higher priority operating entity is not going to use its G-INT resources, then the lower priority operating entities may attempt to access the resources on an opportunistic basis as described above.

In some examples, access to a G-INT or O-INT may be preceded by a reservation signal (e.g., request-to-send (RTS)/clear-to-send (CTS)), and the contention window (CW) may be randomly chosen between one and the total number of operating entities.

In some examples, an operating entity may employ or be compatible with coordinated multipoint (CoMP) communications. For example an operating entity may employ CoMP and dynamic time division duplex (TDD) in a G-INT and opportunistic CoMP in an O-INT as needed.

In the example illustrated in FIG. 3, each sub-interval 320 includes a G-INT for one of Operator A, B, or C. However, in some cases, one or more sub-intervals 320 may include resources that are neither reserved for exclusive use nor reserved for prioritized use (e.g., unassigned resources). Such unassigned resources may be considered an O-INT for any network operating entity, and may be accessed on an opportunistic basis as described above.

In some examples, each subframe 325 may contain 14 symbols (e.g., 250-μs for 60 kHz tone spacing). These subframes 325 may be standalone, self-contained Interval-Cs (ITCs) or the subframes 325 may be a part of a long ITC. An ITC may be a self-contained transmission starting with a downlink transmission and ending with a uplink transmission. In some embodiments, an ITC may contain one or more subframes 325 operating contiguously upon medium occupation. In some cases, there may be a maximum of eight network operators in an A-INT 310 (e.g., with duration of 2 ms) assuming a 250-μs transmission opportunity.

Although three operators are illustrated in FIG. 3, it should be understood that fewer or more network operating entities may be configured to operate in a coordinated manner as described above. In some cases, the location of the G-INT, O-INT, or A-INT within superframe 305 for each operator is determined autonomously based on the number of network operating entities active in a system. For example, if there is only one network operating entity, each sub-interval 320 may be occupied by a G-INT for that single network operating entity, or the sub-intervals 320 may alternate between G-INTs for that network operating entity and O-INTs to allow other network operating entities to enter. If there are two network operating entities, the sub-intervals 320 may alternate between G-INTs for the first network operating entity and G-INTs for the second network operating entity. If there are three network operating entities, the G-INT and O-INTs for each network operating entity may be designed as illustrated in FIG. 3. If there are four network operating entities, the first four sub-intervals 320 may include consecutive G-INTs for the four network operating entities and the remaining two sub-intervals 320 may contain O-INTs. Similarly, if there are five network operating entities, the first five sub-intervals 320 may contain consecutive G-INTs for the five network operating entities and the remaining sub-interval 320 may contain an O-INT. If there are six network operating entities, all six sub-intervals 320 may include consecutive G-INTs for each network operating entity. It should be understood that these examples are for illustrative purposes only and that other autonomously determined interval allocations may be used.

It should be understood that the coordination framework described with reference to FIG. 3 is for illustration purposes only. For example, the duration of superframe 305 may be more or less than 20 ms. Also, the number, duration, and location of sub-intervals 320 and subframes 325 may differ from the configuration illustrated. Also, the types of resource designations (e.g., exclusive, prioritized, unassigned) may differ or include more or less sub-designations.

In 5G NR operations, millimeter wave (mmW) bands can be operated both as unlicensed spectrum (e.g., 60 GHz) or shared spectrum (SS) (e.g., some portion of 30-40 GHz). Nodes belonging to different operators or users may be deployed and share such unlicensed or SS mmW bands. In general, communications over unlicensed spectrum may occur without a central controller organizing the shared communications, while communications over SS may use a central controller for organizing the shared communication. In SS operations, the participating base stations may communicate with the central controller over a backhaul connection, over-the-air, or otherwise. In typical implementations, mmW nodes may have a large number of transmitter (Tx)/receiver (Rx) antennas and benefit for this in terms of reduced interference from neighbor nodes. With the large numbers of Tx/Rx antennas, very high beam forming gains may be achieved. Therefore, unlike traditional unlicensed or SS bands, such as 2.4/3.5/5 GHz, where handling interference from and managing co-existence with other nodes, may be quite complex, co-existence requirements and designs may be different for mmW bands.

For example, traditional listen before talk (LBT) schemes may not be needed in mmW implementations given that the higher degree of beamforming reduces the significance and even the occurrence of interference. LBT's general scheme of backing off to this interference would not be optimal considering the limited SINR gain achieved in doing so is far outweighed by the expense of the reduced medium usage. As such, different forms of co-existence operations may be envisioned, which are triggered only when needed or, at least, infrequently enough to avoid the inefficiencies and complexity that could come with traditional LBT schemes or other over-the-air (OTA) coordination schemes, such as request-to-send (RTS)/clear-to-send (CTS).

Various aspects of the present disclosure are directed to opportunistically activating a contention-based communication procedure for nodes communicating over a shared communication spectrum with a base non-contention procedure state. As persistent interference is determined, a link quality flag is communicated, which, for SS operations, may be used by the central controller to activate a contention-based communication procedure, or for an unlicensed operation, allows the node receiving the link quality flag to trigger the contention-based communication procedure. When received at a central controller, the central controller may use the link quality flags to determine whether there is a persistent interference or link quality issue that is occurring over a given period of time. If the central controller determines that the interference issue is persistent, it may then signal one or more of the neighboring nodes to use contention-based communications.

A base station may not be able to detect interference with its communications directly, but, through link quality reports from one or more UEs, communications reliability issues, and the like, the base station may be able to infer interference from other neighboring base stations. Moreover, diminished link quality may be determined based on channel quality indicator (CQI) reports, signal-to-interference plus noise ratio (SINR), detection of radio link failure, and the like. The contention-based communication procedure may provide for one or more of the base stations or nodes to operate using a contention-based communication scheme (e.g., LBT, OTA coordination, etc.). Other nodes, based on access priority to the medium or other similar prioritization, may operate normally, without using contention-based access mechanisms.

Figure 4:
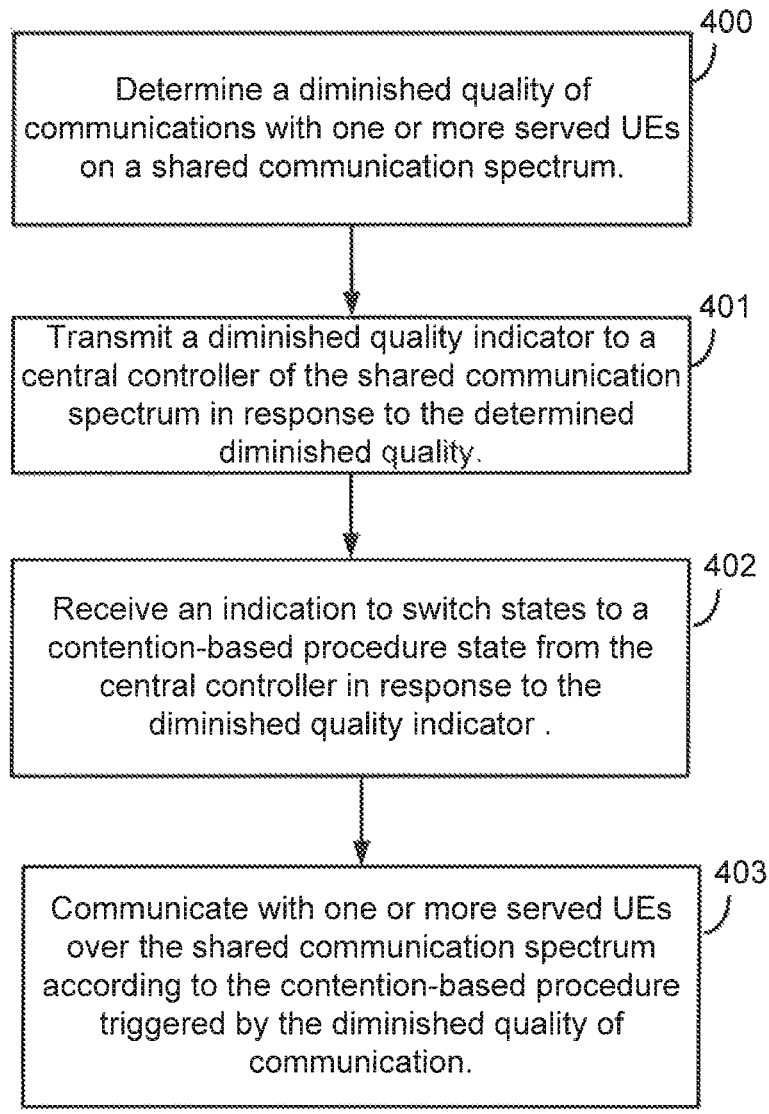
FIG. 4 is a block diagram illustrating example blocks executed to implement one aspect of the present disclosure.

FIG. 4 is a block diagram illustrating example blocks executed to implement one aspect of the present disclosure. The operation environment of the example illustrated by FIG. 4 includes a communication network with multiple network entities, such as base station and UEs, communicating over a shared communication spectrum with a base non-contention procedure state. Thus, with typical communications, the nodes sharing the communication spectrum will communicate without relying on a contention-based procedure to access the spectrum. The shared communication spectrum may be used without a central controller, such as in an unlicensed band operation, or may be used with a central controller, such as in an SS band operation.

Figure 7:
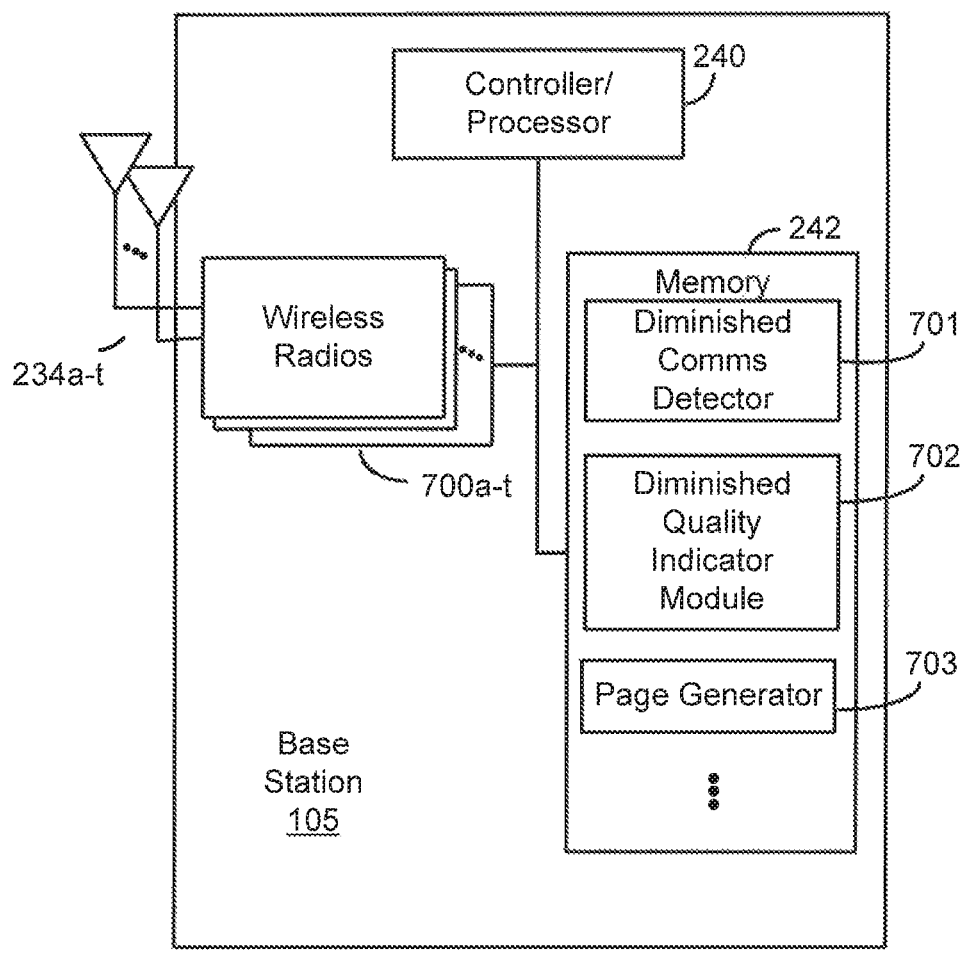
FIG. 7 is a block diagram illustrating an example base station configured according to aspects of the present disclosure.
Figure 8:
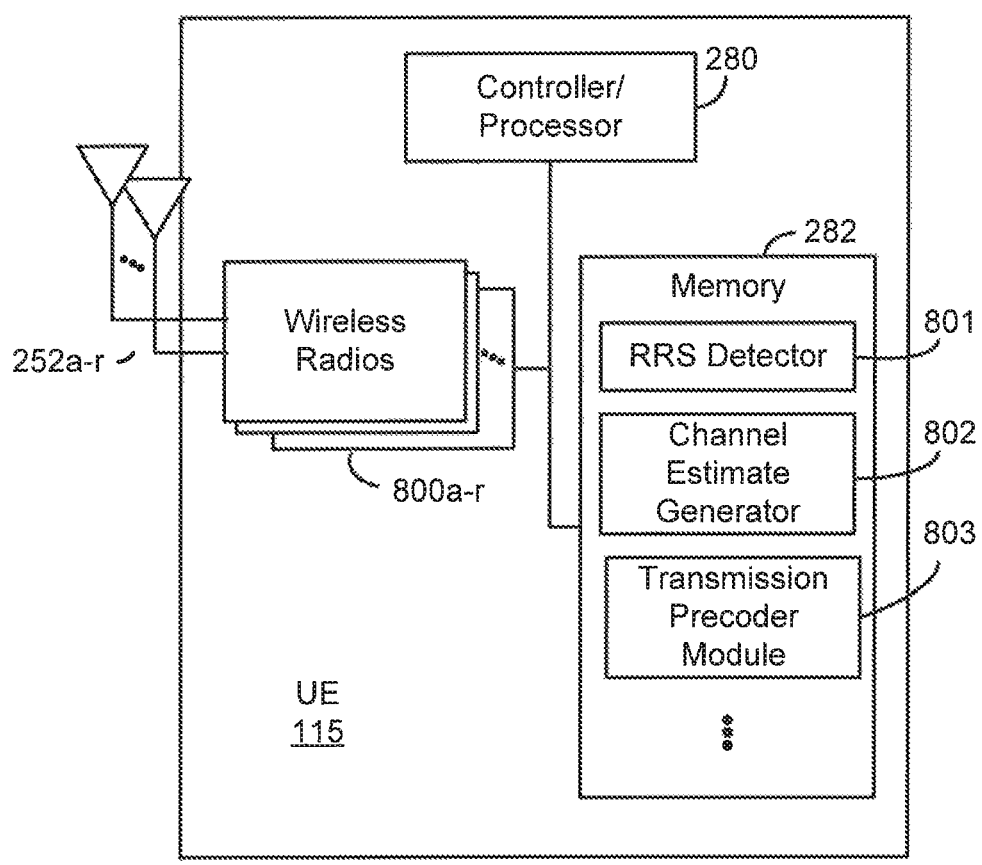
FIG. 8 is a block diagram illustrating an example UE configured according to aspects of the present disclosure.

The example blocks will also be described with respect to base station 105 and UE 115, as illustrated in FIGS. 7 and 8, respectively. FIG. 7 is a block diagram illustrating base station 105 configured according to one aspect of the present disclosure. Base station 105 includes the structure, hardware, and components as illustrated for base station 105 of FIG. 2. For example, base station 105 includes controller/processor 240, which operates to execute logic or computer instructions stored in memory 242, as well as controlling the components of base station 105 that provide the features and functionality of base station 105. Base station 105, under control of controller/processor 240, transmits and receives signals via wireless radios 700a-t and antennas 234a-t. Wireless radios 700a-t includes various components and hardware, as illustrated in FIG. 2 for base station 105, including modulator/demodulators 232a-t, MIMO detector 236, receive processor 238, transmit processor 220, and TX MIMO processor 230.

FIG. 8 is a block diagram illustrating UE 115 configured according to one aspect of the present disclosure. UE 115 includes the structure, hardware, and components as illustrated for UE 115 of FIG. 2. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 800a-r and antennas 252a-r. Wireless radios 800a-r includes various components and hardware, as illustrated in FIG. 2 for base station 105, including modulator/demodulators 254a-r, MIMO detector 256, receive processor 258, transmit processor 264, and TX MIMO processor 266.

At block 400, a first base station determines a diminished quality of communications with one or more served UEs on a shared communication spectrum. The first base station is one base station among several base stations operating within the network environment. By monitoring various interference-based parameters, such as channel quality information (CQI) reports fed back from UEs, radio link failure notifications, signal strength (e.g., total received signal strength indicator (RSSI) or pilot measurements) of one or more neighboring nodes, or other such indications of failed or inaccurate communications with served UEs, the first base station may determine that the diminished quality of communications rises to a threshold level that indicates a more persistent interference with communications at the first base station. For example, base station 105, under control of controller/processor 240, activates diminished comms detector 701, stored in memory 242. The execution environment of diminished comms detector 701 allows base station 105 to determine a diminished quality of communications with one or more served UEs on a shared communication spectrum.

At block 401, the first base station transmits a diminished quality indicator to a central controller in response to the determined diminished quality. Once the persistent interference or diminished quality has been detected, the first base station transmits a diminished quality indicator. This may take the form of a link quality flag to note the detection of the diminished quality and request to switch contention state. The diminished quality indicator may also be configured as various channel quality reports, such as channel quality indicator (CQI) or link quality reports from the UEs, interference statistics maintained by the first base station, or the like. In an unlicensed band operation, the diminished quality indicator may be broadcast or transmitted directly to one or more neighbor base stations that are influencing the link quality. In an SS band operation, the diminished quality indicator may be transmitted to the central controller controlling access to the share communication spectrum. The central controller may then determine, either based on the single diminished quality indicator received or based on other diminished quality indicator received from one or more of the other neighboring base stations that communications interference has reached a persistent level. For example, base station 105, under control of controller/processor 240, may activate diminished quality indicator module 702, stored in memory 242. The execution environment of diminished quality indicator module 702 allows base station 105 to transmit the diminished quality indicator in response to the determined diminished quality, via wireless radios 1100a-t and antennas 234a-t.

At block 402, the first base station receives an indication to switch states to a contention-based procedure state from the central controller in response to the diminished quality indicator. For example, base station 105, under control of controller/processor 240, may receive, via antennas 234a-t, and indication to switch states to a contention-based procedure state from the central controller in response to the diminished quality of communication. The indication may provide a period of time during which the designated base stations are to operate using the contention-based procedure state. The indication may further provide identification of the specific base stations that are to switch to the contention-based procedure state. Thus, the indication may indicate either or both of a time period to use the contention-based procedure state and all or specific ones of the base stations to use the contention-based procedure state for communications.

It should be noted that that contention states for the network nodes may be generally referred to as contention-based and non-contention-based procedure states. However, within each state, there may be varying degrees of contention mechanism. For example, in the default non-contention-based procedure state, the network nodes may still be operating and communicating using a contention-based mechanism. However, the contention parameters are set to such a relaxed state that strict contention procedures (such as those defined in the contention-based procedure state) are only triggered in increased collision or interference scenarios. The more relaxed parameters allows for a certain threshold level of interference without triggering more strict contention mechanisms. Thus, in such non-contention-based procedure state, the energy detection threshold may be set high relative to the energy detection threshold of the contention-based state. Similarly, the contention window for the non-contention-based procedure state may be substantially different from the contention window of the contention-based state. Therefore, while operating in a much lower sensitivity contention state (e.g., the non-contention-based procedure state) for default periods, only in certain circumstances of persistent interference, the central controller may trigger the switch to the more strictly sensitive contention state (e.g., the contention-based procedure state).

At block 403, the first base station communicates with one or more served UEs over the shared communication spectrum according to a contention-based procedure triggered by the diminished quality of communications. For example, base station 105, under control of controller/processor 240, may communicate with one or more served UEs, e.g., UE 115, over the shared communication spectrum via wireless radios 1100a-t and antennas 234a-t. The communication operations between the first base station and any of its served UEs may continue over the shared communication spectrum according to the contention-based procedure triggered by the diminished quality of communication. The contention-based procedure may not require the first base station to actually perform contention-based access to the spectrum. For example, if the first base station belongs to an operator or is of a class that has been indicated to have priority access to the medium, then the contention-based procedure may trigger contention-based access mechanisms for the other base stations operating in the neighborhood. In other aspects, the contention-based procedure may apply contention-based access mechanisms to any one, multiple, or all of the base stations within the communication area.

Figure 5:
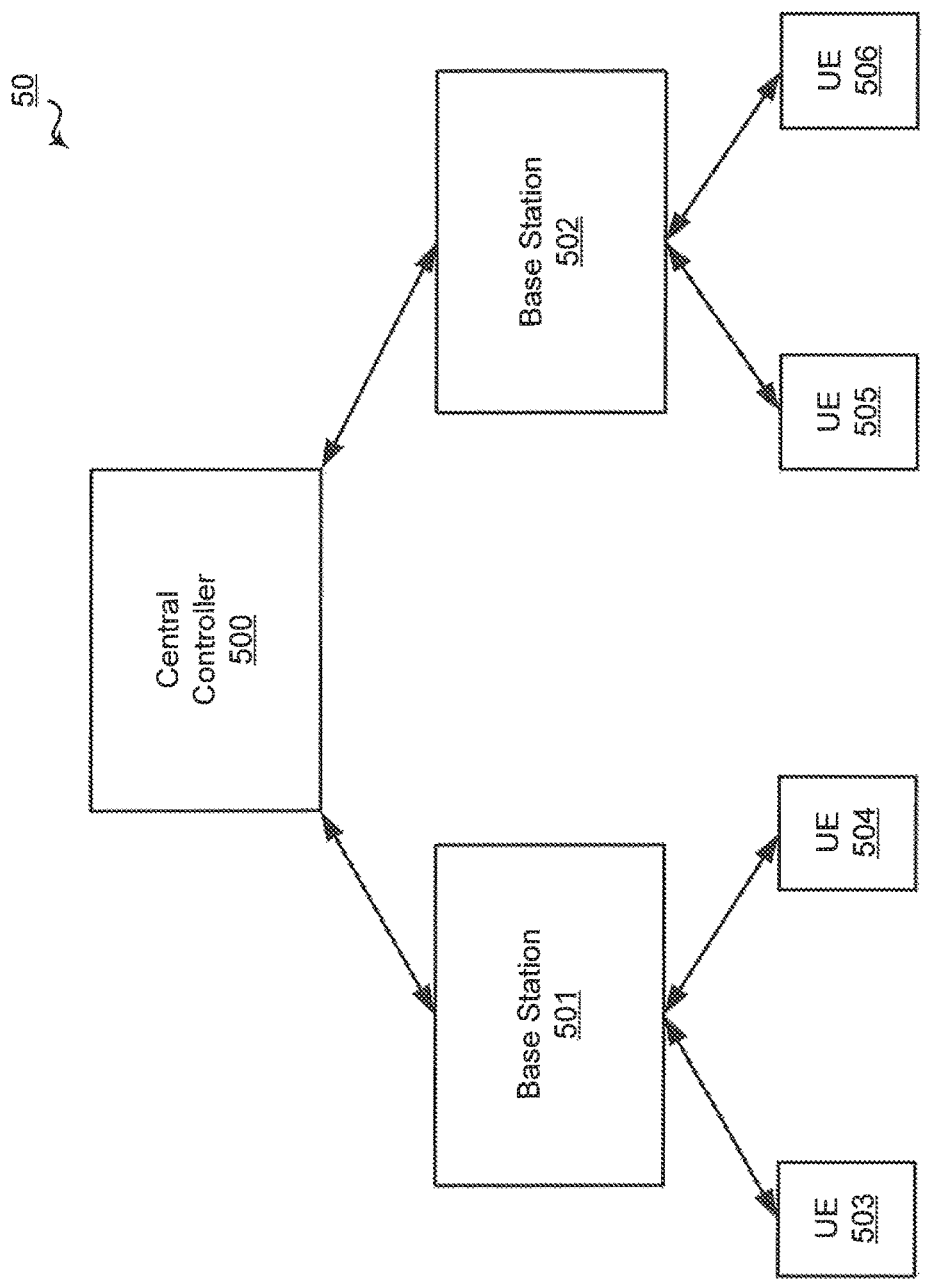
FIG. 5 is a block diagram illustrating a portion of a shared spectrum (SS) network including base stations and a central controller, each configured according to one aspect of the present disclosure.

FIG. 5 is a block diagram illustrating a portion of shared spectrum (SS) network 50 including base stations 501 and 502 and central controller 500, each configured according to one aspect of the present disclosure. Base station 501 serves UEs 503-504 and base station 502 serves UE 505-506. Base stations 501 and 502 may be operated by the same network operating entity or may be from different network operators. Access to the shared communication spectrum in the portion of SS network 50 illustrated in FIG. 5 is controlled by central controller 500. Typically, central controller 500 will enable sharing of the spectrum for base stations 501 and 502, such that the users of base stations 501 and 502, such as UEs 503-506, can operate reliably in SS network 50 with limited or no cross-interference.

It should be noted that central controller 500 may use various rules for enabling access to the shared communication spectrum For example, various priority schemes may be employed in which one of the base stations or, if base stations 501 and 502 belong to different operators, one of the operators is assigned a higher priority to the shared spectrum. The various aspects of the present disclosure may be applicable to any means for providing access to the shared spectrum.

Base station 501 and 502 can continue to perform in-cell scheduling of UEs 503-506 in a similar fashion, as if in a licensed operation, without using contention-based access mechanisms, such as LBT, OTA coordination, and the like. Accordingly, the medium access control (MAC) operation for SS network 50 may operate essentially like a licensed spectrum network, even though base stations 501 and 502 are from different operators or providing communications to different users in an unlicensed spectrum. However, under certain conditions if, for example, UEs 503 and 504, served by base station 501 experience persistent interference from transmissions by base station 502 or UEs 505-506, served by base station 502, base station 501 can transmit a link quality alarm or flag to central controller 500 to request intervention.

In such a scenario, central controller 500 may direct both base station 501 and base station 502 to activate a contention-based access mechanism, such as LBT or some form of OTA contention/coordination, so that base stations 501 and 502 can share time or frequency on the shared communication spectrum. This triggering of contention-based access mechanism when persistent interference is determined may opportunistically reduce or even eliminate cross-interference (e.g., when necessary or on request). Contention-based access mechanisms or contention-based MAC, such as LBT or OTA contention/coordination would then only be triggered when needed and upon direction/coordination of central controller 500—otherwise, no contention-based operations are performed. As such, base stations 501-502 will operate in a base non-contention procedure state until persistent interference triggers a transition to a contention-based procedure state for one or both of them.

The trigger for prompting a base station, such as base stations 501-502, to transmit the link quality flag or signal may be dynamically determined using feedback from UEs 503-506 (e.g., channel quality indicator (CQI) reports, block error rate (BLER), repeated negative acknowledgment (NAK), etc.) or other indications of poor link quality (e.g., repeated radio link failures, inability to communicate with client devices, etc.). When base station 501 and/or 502 determine such persistent interference, either based on UE feedback or analysis of link quality indications, the determining base station would transmit the link quality flag or signal to central controller 500 over a backhaul connection or other such communication connection with central controller 500.

When central controller 500 receives a link quality flag from one or both of base stations 501 and 502, a determination may be made whether to request or instruct one or more of base stations 501 and 502 to switch to a contention-based access mechanism. The decision by central controller 500 can be based on any number of inputs in addition to the interference flag received from the base station. For example, aspects may use a combination of various inputs, such as the link quality flag, error events received from base stations 501-502, relative medium utilization of base stations 501-502, quality of service (QoS) type assigned to the traffic being served by base stations 501-502, or the like. Different aspects may use any number of such inputs or may be triggered merely by receipt of the link quality flag from any one or more of base stations 501-502. If the input or inputs considered by central controller 500 indicate that a contention-based procedure should be activated, central controller 500 may transmit a contention activation signal to either or both of base stations 501-502 for activating a contention-based procedure. The contention-based procedure may direct all of the neighboring base stations (e.g, base stations 501-502) to begin using contention-based access mechanisms for any communications conducted using the shared communication spectrum, or may direct only some of the neighboring base stations (e.g., non-priority base stations, base stations serving non-priority traffic type, non-priority power class, etc.) to begin using contention-based access mechanisms, while the other neighboring base stations continue operating as normal, without such contention mechanisms.

Additional aspects may provide for central controller 500 to provide a contention period when activating the contention-based access mechanisms, such that the affected base station will operate the contention mechanism for the contention period and then fall back to the default non-contention communications when the period ends.

It should be noted that the various aspects operated for shared spectrum operations, such as SS network 50, may operate regardless of whether base stations 501 and 502 are time-synchronized to each other or operating with asynchronous timing.

It should further be noted that the various aspects of the present disclosure may be operable with any variety of contention-based access mechanism, such as various types of contention-based MAC protocols, LBT, OTA contention/coordination, or the like. Such different types of contention-based access mechanisms are within the scope of the present disclosure.

It should further be noted that the principles of the various aspects of the present disclosure may be applicable to mmW bands as well as non-mmW bands. Because of the particular operational aspects of mmW bands, the various aspects may be well suited for such applications, but not limited only to operation within mmW shared spectrum networks.

Unlike shared spectrum networks, unlicensed spectrum networks typically do not have a central coordinating entity that manages spectrum access of different neighboring nodes. Additional aspects of the present disclosure are directed to a co-existence mechanism for network nodes operating within an unlicensed spectrum network.

Figure 6:
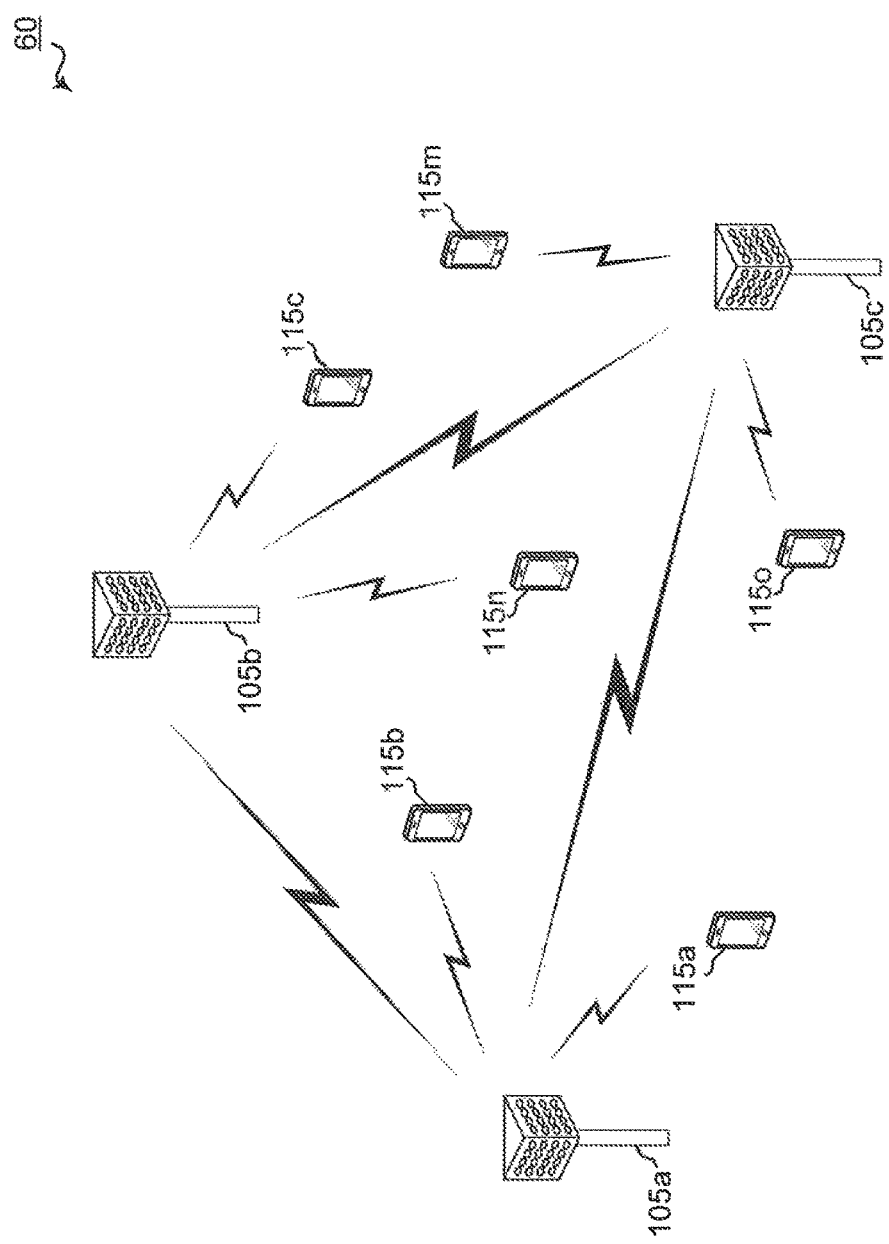
FIG. 6 is a block diagram illustrating a portion of an unlicensed spectrum network including base stations and UEs, each configured according to one aspect of the present disclosure.

FIG. 6 is a block diagram illustrating a portion of unlicensed spectrum network 60 including base stations 105a-105e and UEs 115a-115c and 115m-115o, each configured according to one aspect of the present disclosure. In the example aspect of FIG. 6, each node within the illustrated portion of unlicensed spectrum network 60 operates, by default, with a non-contention procedure state. Base stations 105a-105c each serve UEs over a shared, unlicensed spectrum (base station 105a serves UEs 115a-115b, base station 105b serves UEs 115c and 115n, and base station 105c serves UEs 115m and 115o). Base stations 105a-105c and their users, UEs 115a-115c and 115m-115o, monitor for potential link quality issues and persistent interference. When a base station, such as base stations 105a-105c, determines a link quality issue or persistent interference, either directly or indirectly through feedback from their served UEs, UEs 115a-115c or 115m-115o, respectively, the determining base station transmits a link quality flag requesting activation of a contention-based procedure, which may include each of base stations 105a-105c operating a contention-based access mechanism or only selected ones of base stations 105a-105c.

In the illustrated example, each of base stations 105a-105c is periodically tasked to listen for transmissions from the other base stations. For example, base station 105a listens for transmissions from base stations 105b and 105c, base station 105b listens for transmissions from base stations 105a and 105c, and base station 105c listens for transmissions from base stations 105a and 105b. These transmissions (e.g., interference flags, interference signals, etc.) can convey enablement of the contention-based access protocol or not. The time period during which such link quality flags or signals may be transmitted by the base station may be referred to as a coordination interval. Thus, base stations 105a-105c would know the coordination interval when to tune to listen for any link quality flags transmitted by the other base stations.

Additional aspects of the present disclosure may be implemented where the nodes of unlicensed spectrum network 60 (e.g., base stations 105a-105c) are asynchronous in timing with each other. In such aspects, when the nodes are asynchronous, the coordination interval of the other base stations within unlicensed spectrum network 60 may be unknown to the other base stations at the beginning. In such aspects, each of base stations 105a-105c periodically advertises its coordinating interval timing. This coordinating interval advertising interval transmitted from one base station, such as base station 105a, describes the timing information of when base station 105a would transmit an interference flag, should persistent interference or poor link quality by detected by base station 105. The advertising interval may be obtained by the other base stations (e.g., base station 105b and 105c) through periodic monitoring. Base stations 105b and 105c may periodically monitor OTA attempting to detect the coordinating interval advertising interval. Using this advertising interval of the different nodes in the network, whenever a base station, such as base station 105a detects issues in link quality or persistent interference, it will transmit a link quality flag during its coordinating interval. Base stations 105b and 105c, using OTA monitoring, detect when to monitor for the link quality flag from base station 105a by reading the detected advertising timing detected prior by base stations 105b and 105c sent by base station 105a. Thus, when base stations 105b and 105c receive the link quality flag, they may switch communication access to the shared communication spectrum to use a contention-based access mechanism. Alternatively, base station 105a may request a periodic interference free time interval for uncontested access to the shared spectrum.

When transmitting the link quality flag, base stations 105a-105c may broadcast or unicast the transmissions. When the base station cannot determine the exact source of the interference or simply is not configured to identify such exact source, it may broadcast the link quality flag. Otherwise, if the base station is able to identify the source of the interference, it may unicast the link quality flag to the particular node.

Referring back to FIG. 5, instead of making the determination to trigger the contention-based access mechanism, base stations 501 and 502 may trigger the mechanisms on their own. Central controller 500 may provide transmission opportunity scheduling information to base stations 501 and 502 that identifies the time slot, periodicity, duration, and other such timing or scheduling information assigned to each base station for transmitting link quality flags. Thus, each of base stations 501 and 502 will monitor for link quality flags at each allocated transmission opportunity of the other base station. When such link quality flag is detected, or if either of base station 501 or 502 itself determines a diminished quality of communication and transmits its own link quality flag at the allocated transmission opportunity, the contention-based access mechanism may be triggered for one or both of base stations 501 and 502. For example, if one of base stations 501 and 502 has priority over the other, the appearance of the link quality flag, either through determination by the base station or detection from transmission by the other base station would trigger the base station that did not have priority access to the shared spectrum to begin the contention-based access mechanism.

One additional aspect of the present disclosure provides for a base state or mode of communication that is non-contention based. The central controller 500 may identify dedicated slots for each of base station 501 or 502, or operator to transmit essential control channel signaling (e.g., transmission of synchronization/discovery signals, system information, etc.). Transmission of these control channel signals will operate according to the dedicated scheduling provided by central controller 500. However, for transmissions other than the essential control channel signaling, the base, non-contention mode applies. Thus, when the diminished quality of communications is detected and interference determined, the base stations may then switch to a contention-based access mechanism for only the non-essential control channel signaling. The essential control channel signaling will continue to be transmitted according to the dedicated scheduling.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIG. 4 may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
   determining, at a first base station, a diminished quality of communications with one or more served user equipments (UEs) on a shared communication spectrum, wherein the first base station shares the shared communication spectrum with the one or more neighbor base stations communicating with one or more one or more neighbor UEs in a base non-contention procedure state;
   transmitting, by the first base station, a diminished quality indicator to a central controller of the shared communication spectrum in response to the determined diminished quality;
   receiving, by the first base station, an indication to switch states to a contention-based procedure state from the central controller in response to the diminished quality of communications; and
   communicating, by the first base station, with the one or more served UEs over the shared communication spectrum according to the contention-based procedure state triggered by the diminished quality of communications.

2. The method of claim 1, wherein the determining the diminished quality includes:
   determining the diminished quality based on a low quality communication occurring for at least a predetermined period of time.

3. The method of claim, 2, wherein the diminished quality indicator includes one or more of: a channel quality measurement received from the one or more served UEs, a link quality report received from the one or more served UEs, and link quality statistics determined by the first base station.

4. The method of claim 2, wherein the low quality communication is determined based on one or more of: channel quality measurements received from the one or more UEs, signal strengths of one or more neighbor base stations and one or more neighbor UEs.

5. The method of claim 1, wherein the indication identifies the contention-based procedure state as one of:
   triggering each of the first base station and the one or more neighbor base stations to communicate over the shared communication spectrum using a contention-based access procedure; and
   triggering one or more of the first base station and the one or more neighbor base stations to communicate over the shared communication spectrum using the contention-based access procedure and a remaining one or more of the first base station and the one or more neighbor base stations to continue communication over the shared communication spectrum in the base non-contention procedure state, wherein the one or more of the first base station and the one or more neighbor base stations to communicate using the contention-based access procedure are selected according to a priority of access to the shared communication spectrum.

6. The method of claim 5, wherein the indication further identifies a contention period during which the first base station and the one or more neighbor base stations operate the contention-based procedure state.

7. The method of claim 5, wherein the indication further identifies which base stations of the one or more of the first base station and the one or more neighbor base stations to communicate using the contention-based access procedure.

8. The method of claim 5, wherein the indication is received from the central controller further based on one of:
   a level of medium utilization between the first base station and the one or more neighbor base stations; and
   a quality of service of traffic served by the first base station and the one or more neighbor base stations.

9. The method of claim 1, further including:
   receiving, at the first base station from a central controller, transmission scheduling for control channel signaling of the first base station; and
   transmitting, by the first base station, the control channel signaling according to the non-contention procedure state.

10. The method of claim 9, wherein the control channel signaling includes one or more of: synchronization signals, discovery signals, system information signals.

11. The method of claim 1,
    wherein the base non-contention procedure state includes a contention-based procedure having contention parameters set below a maximum allowed interference level; and
    wherein the contention-based procedure state includes a contention-based access process having the contention parameters set below a minimum allowed interference level.

12. A base station configured for wireless communication, comprising:
    means for determining a diminished quality of communications with one or more served user equipments (UEs) on a shared communication spectrum, wherein the shared communication spectrum is shared between the base station and one or more neighbor base stations communicating with one or more one or more neighbor UEs in a base non-contention procedure state;
    means for transmitting a diminished quality indicator to a central controller of the shared communication spectrum in response to the determined diminished quality;
    means for receiving an indication to switch states to a contention-based procedure state from the central controller in response to the diminished quality of communications; and
    means for communicating with the one or more served UEs over the shared communication spectrum according to the contention-based procedure state triggered by the diminished quality of communications.

13. The method of claim 12, wherein the determining the diminished quality includes:
    determining the diminished quality based on a low quality communication occurring for at least a predetermined period of time.

14. The apparatus of claim 12, wherein the indication identifies the contention-based procedure state as one of:
    means for triggering each of the first base station and the one or more neighbor base stations to communicate over the shared communication spectrum using a contention-based access procedure; and means for triggering one or more of the first base station and the one or more neighbor base stations to communicate over the shared communication spectrum using the contention-based access procedure and a remaining one or more of the first base station and the one or more neighbor base stations to continue communication over the shared communication spectrum in the base non-contention procedure state, wherein the one or more of the first base station and the one or more neighbor base stations to communicate using the contention-based access procedure are selected according to a priority of access to the shared communication spectrum.

15. The apparatus of claim 14, wherein the indication further identifies a contention period during which the first base station and the one or more neighbor base stations operate the contention-based procedure state.

16. The apparatus of claim 14, wherein the indication further identifies which base stations of the one or more of the first base station and the one or more neighbor base stations to communicate using the contention-based access procedure.

17. The apparatus of claim 14, wherein the indication is received from the central controller further based on one of:
   a level of medium utilization between the first base station and the one or more neighbor base stations; and
   a quality of service of traffic served by the first base station and the one or more neighbor base stations.

18. The apparatus of claim 12,
   wherein the base non-contention procedure state includes a contention-based procedure having contention parameters set below a maximum allowed interference level; and
   wherein the contention-based procedure state includes a contention-based access process having the contention parameters set below a minimum allowed interference level.

19. A non-transitory computer-readable medium having program code recorded thereon, the program code comprising:
   program code executable by a computer for causing the computer to determine, at a first base station, a diminished quality of communications with one or more served user equipments (UEs) on a shared communication spectrum, wherein the first base station shares the shared communication spectrum with the one or more neighbor base stations communicating with one or more one or more neighbor UEs in a base non-contention procedure state;
   program code executable by the computer for causing the computer to transmit, by the first base station, a diminished quality indicator to a central controller of the shared communication spectrum in response to the determined diminished quality;
   program code executable by the computer for causing the computer to receive, by the first base station, an indication to switch states to a contention-based procedure state from the central controller in response to the diminished quality of communications; and
   program code executable by the computer for causing the computer to communicate, by the first base station, with the one or more served UEs over the shared communication spectrum according to the contention-based procedure state triggered by the diminished quality of communications.

20. An apparatus configured for wireless communication, the apparatus comprising:
   at least one processor; and
   a memory coupled to the at least one processor,
   wherein the at least one processor is configured;
      to determining, at a first base station, a diminished quality of communications with one or more served user equipments (UEs) on a shared communication spectrum, wherein the first base station shares the shared communication spectrum with the one or More neighbor base stations communicating with one or more one or more neighbor UEs in a base non-contention procedure state;
      transmitting, by the first base station, a diminished quality indicator to a central controller of the shared communication spectrum in response to the determined diminished quality;
      receiving, by the first base station, an indication to, switch states to a contention-based procedure state from the central controller in response to the diminished quality of communications; and
      communicating, by the first base station, with the one or more served UEs over the shared communication spectrum according to the contention-based procedure state triggered by the diminished quality of communications.

21. The apparatus of claim 20, wherein the determining the diminished quality includes:
   determining the diminished quality based on a low quality communication occurring for at least a predetermined period of time.

22. The apparatus of claim 21, wherein the diminished quality indicator includes one or more of: a channel quality measurement received from the one or more served UEs, a link quality report received from the one or more served UEs, and link quality statistics determined by the first base station.

23. The apparatus of claim 21, wherein the low quality communication is determined based on one or more of: channel quality measurements received from the one or more UEs, signal strengths of one or more neighbor base stations and one or more neighbor UEs.

24. The apparatus of claim 20, wherein the indication identifies the contention-based procedure state as one of:
   triggering each of the first base station and the one or more neighbor base stations to communicate over the shared communication spectrum using a contention-based access procedure; and
   triggering one or more of the first base station and the one or more neighbor base stations to communicate over the shared communication spectrum using the contention-based access procedure and a remaining one or more of the first base station and the one or more neighbor base stations to continue communication over the shared communication spectrum in the base non-contention procedure state, wherein the one or more of the first base station and the one or more neighbor base stations to communicate using the contention-based access procedure are selected according to a priority of access to the shared communication spectrum.

25. The apparatus of claim 24, wherein the indication further identifies a contention period during which the first base station and the one or more neighbor base stations operate the contention-based procedure state.

26. The apparatus of claim 24, wherein the indication further identifies which base stations of the one or more of the first base station and the one or more neighbor base stations to communicate using the contention-based access procedure.

27. The apparatus of claim 24, wherein the indication is received from the central controller further based on one of:
   a level of medium utilization between the first base station and the one or more neighbor base stations; and
   a quality of service of traffic served by the first base station and the one or more neighbor base stations.

28. The apparatus of claim 20, further including:
   receiving, at the first base station from a central controller, transmission scheduling for control channel signaling of the first base station; and
   transmitting, by the first base station, the control channel signaling according to the non-contention procedure state.

29. The apparatus of claim 28, wherein the control channel signaling includes one or more of: synchronization signals, discovery signals, system information signals.

30. The apparatus of claim 20,
   wherein the base non-contention procedure state includes a contention-based procedure having contention parameters set below a maximum allowed interference level; and
   wherein the contention-based procedure state includes a contention-based access process having the contention parameters set below a minimum allowed interference level.

* * * * *